(12) United States Patent
Boone et al.

(10) Patent No.: US 11,505,118 B2
(45) Date of Patent: Nov. 22, 2022

(54) BOAT TRAILER DEPTH INDICATOR MODULE

(71) Applicants: Affinity Displays & Expositions, Cincinnati, OH (US); Kelly Boone, Goshen, OH (US); Jeremy Pendergrass, Hamilton, OH (US)

(72) Inventors: Kelly Boone, Goshen, OH (US); Jeremy Pendergrass, Hamilton, OH (US)

(73) Assignee: Affinity Displays & Expositions, Cincinnati, OH (US)

( * ) Notice: Subject to any disclaimer, the term of this patent is extended or adjusted under 35 U.S.C. 154(b) by 0 days.

(21) Appl. No.: 17/524,025

(22) Filed: Nov. 11, 2021

(65) Prior Publication Data

US 2022/0144165 A1    May 12, 2022

Related U.S. Application Data

(60) Provisional application No. 63/112,698, filed on Nov. 12, 2020.

(51) Int. Cl.
| | |
|---|---|
| *B60Q 1/50* | (2006.01) |
| *B60P 3/10* | (2006.01) |
| *G01F 23/00* | (2022.01) |
| *F16B 7/18* | (2006.01) |
| *G01F 23/30* | (2006.01) |
| *H02S 40/38* | (2014.01) |

(52) U.S. Cl.
CPC .............. *B60Q 1/50* (2013.01); *B60P 3/10* (2013.01); *F16B 7/187* (2013.01); *G01F 23/0007* (2013.01); *G01F 23/30* (2013.01); *H02S 40/38* (2014.12)

(58) Field of Classification Search
CPC ... B60Q 1/50; B60P 3/10; F16B 7/187; F16B 2/065; G01F 23/0007; G01F 23/30; G01F 23/70; H02S 40/38
See application file for complete search history.

(56) References Cited

U.S. PATENT DOCUMENTS

| | | | |
|---|---|---|---|
| 3,995,251 A | 11/1976 | Jones | |
| 4,940,251 A * | 7/1990 | Willmsen | B60P 3/1075 116/28 R |
| 5,013,206 A * | 5/1991 | Ernst | B60P 3/1033 114/344 |
| 5,097,250 A | 3/1992 | Hernandez | |

(Continued)

*Primary Examiner* — Orlando Bousono
(74) *Attorney, Agent, or Firm* — Wood Herron & Evans LLP

(57) ABSTRACT

A boat trailer depth indicator module and method of installation thereof. The boat trailer depth indicator allows a driver towing a boat trailer to position the boat trailer at an appropriate depth in the water on a boat ramp to launch or recover a boat without the need for an assistant. When the boat trailer is located at an appropriate depth in the water, the boat trailer depth indicator provides a signal to the driver. The signal communicates to the driver and/or the helmsman of the boat, for example, that the boat trailer is sufficiently submerged and ready for launch or recovery of the boat. The boat trailer depth indicator module is independent of vehicle or trailer power and can be installed and adjusted quickly without the use of tools.

23 Claims, 10 Drawing Sheets

(56) References Cited

U.S. PATENT DOCUMENTS

| | | | | |
|---|---|---|---|---|
| 5,396,857 | A | * | 3/1995 | Emery, Jr. ................ B60Q 1/52 |
| | | | | 280/414.1 |
| 5,596,944 | A | * | 1/1997 | Massie .................... B60Q 1/50 |
| | | | | 116/28 R |
| 5,850,175 | A | | 12/1998 | Yeilding |
| 5,949,329 | A | * | 9/1999 | Woodard ............. B60P 3/1075 |
| | | | | 340/687 |
| 7,876,234 | B1 | | 1/2011 | Spears, Jr. |
| 8,638,060 | B2 | | 1/2014 | Bruneau |
| 9,127,940 | B2 | | 9/2015 | Nirenberg |
| 2003/0137124 | A1 | * | 7/2003 | Marchese ............ B60P 3/1075 |
| | | | | 280/414.1 |
| 2004/0211351 | A1 | * | 10/2004 | Emerson ................ B60D 1/36 |
| | | | | 116/28 R |
| 2011/0018724 | A1 | | 1/2011 | Little et al. |
| 2014/0091938 | A1 | * | 4/2014 | Nirenberg ............... G08B 5/36 |
| | | | | 340/691.1 |
| 2016/0264220 | A1 | * | 9/2016 | Laceky ............. H04N 5/23293 |
| 2020/0094738 | A1 | * | 3/2020 | Lane ........................ B60T 7/20 |
| 2021/0229589 | A1 | * | 7/2021 | Wright, III ........... G01S 13/867 |

\* cited by examiner

BOAT TRAILER DEPTH INDICATOR MODULE

CROSS-REFERENCE TO RELATED APPLICATIONS

This application is related to and claims priority to U.S. Provisional Patent Application Ser. No. 63/112,698, filed on Nov. 12, 2020, the entire content of which is herein incorporated by reference in its entirety.

TECHNICAL FIELD

This application relates to an indicator module for attachment to a boat trailer, which is configured to assist during boat launch and recovery.

BACKGROUND

Boating is a popular recreational activity. Alas, the nautical joys of boating are often bookended by the difficulty and stresses of launching a boat from and recovering a boat to a boat trailer, for any boat not stored in the water, e.g., at docks. In order to launch or recover such a boat, a boat trailer must be positioned appropriately on a boat ramp. Proper positioning of the boat trailer is critical to a smooth launch and recovery. If the boat trailer is not deep enough in the water (e.g., not far enough down the ramp), then the boat will not be able to move onto or off of the trailer. If the boat trailer is too deep in the water (e.g., too far down the ramp), then the boat will not rest properly on the cradle of the boat trailer. Improper positioning of the boat trailer in the water could damage the boat, the boat trailer, or even the boat ramp. Further, backing a boat trailer with a towing vehicle can be quite difficult, particularly when needing to accurately position the boat trailer while operating the towing vehicle and relying on rearview mirrors to navigate correctly.

Compounding the issues of positioning are the expectations of other boaters waiting to use the boat ramp. Boat ramps are typically busy at the times when boat owners want to enjoy this recreational activity, when weather is nice, for example. In such circumstances, drivers may be queued in line waiting to use the boat ramp to launch or recover their own boats. Thus, it is expected that one using the boat ramp will quickly and accurately position their boat trailer on the ramp, stopping at the correct water depth, and efficiently launch or recover their boat from or to the boat trailer. Failure to launch or recover your boat swiftly will draw the ire of other boaters thereby causing additional, undue stress.

Because there is little tolerance for improper positioning or delays, launching and recovering a boat can require or involve the coordinated efforts of at least three individuals—a driver of the vehicle towing the boat, a helmsman on the boat it, and an assistant on the boat ramp. An assistant is typically necessary because it can be difficult for a driver, towing a boat trailer, to determine when the boat trailer is properly positioned. The assistant relays to the driver when the boat trailer is at an appropriate depth in the water which signals to the driver to stop descending down the boat ramp. At this point, the helmsman of the boat is free to leave the trailer (e.g., in the case of a launch) or enter the trailer (e.g., in the case of a recovery) with the boat 14.

Realistically, a driver will not always have the help of an assistant stationed on the boat ramp. In that scenario, a driver or helmsman would be left to guess whether or not the boat trailer is sufficiently submerged. In view of this technical problem, devices have been developed for helping communicate to a driver regarding correct positioning of a boat trailer relative to the water along a boat ramp. These prior systems include those shown in U.S. Pat. No. 5,850,175 to Yeilding; U.S. Pat. No. 7,876,234 to Spears; and U.S. Pat. No. 9,127,940 to Nirenberg, for example. However, these known devices exhibit various shortcomings. For example, many of these known devices require connections to external power or external charging to function, significant tooling work for installation and positioning on a boat trailer, and some do not provide adequate signals to both a towing vehicle driver and a helmsman on the boat itself. Accordingly, it is desired to further improve such boat trailer assist devices to make them more reliable and easier to use and install.

SUMMARY

In accordance with embodiments of the invention, aspects of a boat trailer depth indicator module and method of installation thereof are described. Aspects of a boat trailer depth indicator module and method of installation thereof help to avoid, alleviate, or otherwise minimize the drawbacks or shortcomings associated with existing devices, systems, and methods.

In one implementation of the invention, a boat trailer depth indicator module configured to be removably coupled to a slide rail attached to a boat trailer is disclosed. The boat trailer depth indicator module includes a submersible enclosure containing an actuation element located within an internal cavity at least partially surrounded by a protective cover. The protective cover is configured to allow communication of water into and out of the internal cavity. The boat trailer depth indicator module also includes an indicator arm removably coupled to the submersible enclosure. The indicator arm extends laterally and outwardly from the submersible enclosure. The indicator arm includes an indicator at a free end. The indicator is configured to provide a visual signal. The boat trailer depth indicator module also includes a power source mounted to and located on the submersible enclosure. The power source selectively powers the indicator. The boat trailer depth indicator module further includes a mounting bracket connecting and supporting the submersible enclosure and the indicator arm relative to one another. The mounting bracket is configured to selectively engage the slide rail to secure the indicator module in a position relative to the slide rail. An amount of water entering the submersible enclosure activates the actuation element and operatively connects the power source to the indicator thereby illuminating the indicator to provide the visual signal.

In one embodiment, the submersible enclosure further includes a mounting plate, the actuation element mounted to the mounting plate within the submersible enclosure. The mounting plate may be removeable from the submersible enclosure.

In another embodiment, the actuation element includes a float switch.

In yet another embodiment, the protective cover is selectively permeable and configured to prevent objects or debris from entering the internal cavity. Further, the protective cover may include a series of regular, repeating apertures to form a cage-like construction that is selectively permeable according to a size of the apertures. Moreover, the submersible enclosure may be shaped like a rectangular prism. The protective cover may include a pair of plates, each plate of the pair of plates secured to an opposing face of the submersible enclosure.

In a further embodiment, the indicator arm extends only horizontally from the submersible enclosure. Additionally, the indicator may include a LED. The LED is configured to illuminate to provide the visual signal.

In one embodiment, the boat trailer depth indicator module is operable without connection to power other than from the power source and the boat trailer depth indicator module is operable without communications with or to other devices. Further, in an embodiment, the power source may include a photovoltaic cell connected to a battery. The photovoltaic cell provides power to the battery. Additionally, the photovoltaic cell may be mounted on an exterior of the submersible enclosure and the battery may be mounted within the internal cavity of the submersible enclosure. To this end, the boat trailer depth indicator module may be operable as a fully self-contained apparatus, making installation and use of the module easier for persons who use boats and boat trailers.

In another embodiment, the mounting bracket is integrally formed as a unitary piece with the submersible enclosure. Moreover, the submersible enclosure may include a projection extending from the submersible enclosure and located a distance above the mounting bracket. The projection defining a slot with the mounting bracket to receive an end of the indicator arm therein.

In yet another embodiment, the depth indicator module includes an adjustment knob engaging with an adjustment screw to removably secure the indicator module to the slide rail. The adjustment screw passes through both the mounting bracket and the indicator arm to secure the depth indicator module to the slide rail. The adjustment knob and the adjustment screw allow for the boat trailer depth indicator module to be adjusted to various positions on the slide rail. Additionally, the depth indicator module can be mounted to the slide rail and adjusted to various positions on the slide rail without the use of tools. Moreover, the indicator module is positioned on the slide rail such that the water entering the submersible enclosure will cause activation of the indicator when a boat trailer is submersed at a boat ramp to an appropriate depth for launching or recovering a boat from or to the boat trailer.

In a further embodiment, the depth indicator module includes an adjustment knob engaging with an adjustment screw to removably secure the indicator module to the slide rail. The adjustment screw passes through both the mounting bracket and the indicator arm to secure the depth indicator module to the slide rail. The adjustment knob and the adjustment screw allow for the boat trailer depth indicator module to be adjusted to various positions on the slide rail without the use of tools. The power source includes a photovoltaic cell connected to a battery. The photovoltaic cell provides power to the battery. The photovoltaic cell is mounted on an exterior of the submersible enclosure. The battery is mounted within the internal cavity of the submersible enclosure. Additionally, the indicator arm extends only horizontally from the submersible enclosure In one embodiment, the boat trailer depth indicator module is configured to generate a remote signal. The remote signal selected from the group consisting of: a Wi-Fi signal, a Bluetooth signal, a text message signal, a phone call signal, and a mobile app notification signal.

In another implementation of the invention, a method for installing a boat trailer depth indicator module to a slide rail attached to a boat trailer is disclosed. The method includes providing a slide rail and attaching the slide rail to a boat trailer. The method also includes providing the boat trailer depth indicator module. The depth indicator module includes a submersible enclosure containing an actuation element located within an internal cavity. The internal cavity is at least partially surrounded by a protective cover. The protective cover configured to allow communication of water into and out of the internal cavity. The depth indicator module also includes an indicator arm removably coupled to the submersible enclosure. The indicator arm extends laterally and outwardly from the submersible enclosure. The indicator arm includes an indicator at a free end. The depth indicator module also includes a power source mounted to and located on the submersible enclosure. The power source selectively powers the indicator. The depth indicator module further includes a mounting bracket connecting and supporting the submersible enclosure and the indicator arm relative to one another. The mounting bracket is configured to selectively engage the slide rail. The method further includes sliding the depth indicator module onto an end of the slide rail and removably securing the depth indicator module to the slide rail at a position.

In one embodiment, the step of removably securing the depth indicator module in the method for installing a boat trailer depth indicator module further includes selecting the position of the depth indicator module on the slide rail such that water entering the submersible enclosure will cause activation of the indicator when the boat trailer is submersed at a boat ramp to an appropriate depth for launching or recovering a boat from or to the boat trailer.

In another embodiment, the step of removably securing the depth indicator module in the method for installing a boat trailer depth indicator module further includes twisting an adjustment knob onto the adjustment screw. The adjustment screw passes through both the mounting bracket and the indicator arm. the adjustment knob and the adjustment screw allow for the boat trailer depth indicator module to be adjusted to various positions on the slide rail In yet another embodiment, the step of removably securing the depth indicator module in the method for installing a boat trailer depth indicator module is performed without the use of tools. Further, the boat trailer depth indicator module can be adjusted to various positions on the slide rail without the use of tools.

The steps and elements described herein as part of various embodiments and aspects can be reconfigured and combined in different combinations to achieve the technical effects as may be desired. To this end, the embodiments and aspects can be combined in any combination or sub-combination. Other aspects, features, benefits, and advantages of the present invention will become apparent to a person of skill in the art from the detailed description of various embodiments with reference to the accompanying drawing figures, all of which comprise part of the disclosure.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate embodiments of the invention and, together with the detailed description given below, serve to explain one or more embodiments of the invention.

DETAILED DESCRIPTION

The exemplary embodiments described herein are provided for illustrative purposes and are not limiting. Other exemplary embodiments are possible, and modifications may be made to the exemplary embodiments within the scope of the present disclosure. Therefore, this Detailed Description is not meant to limit the scope of the present disclosure.

Figure 5:
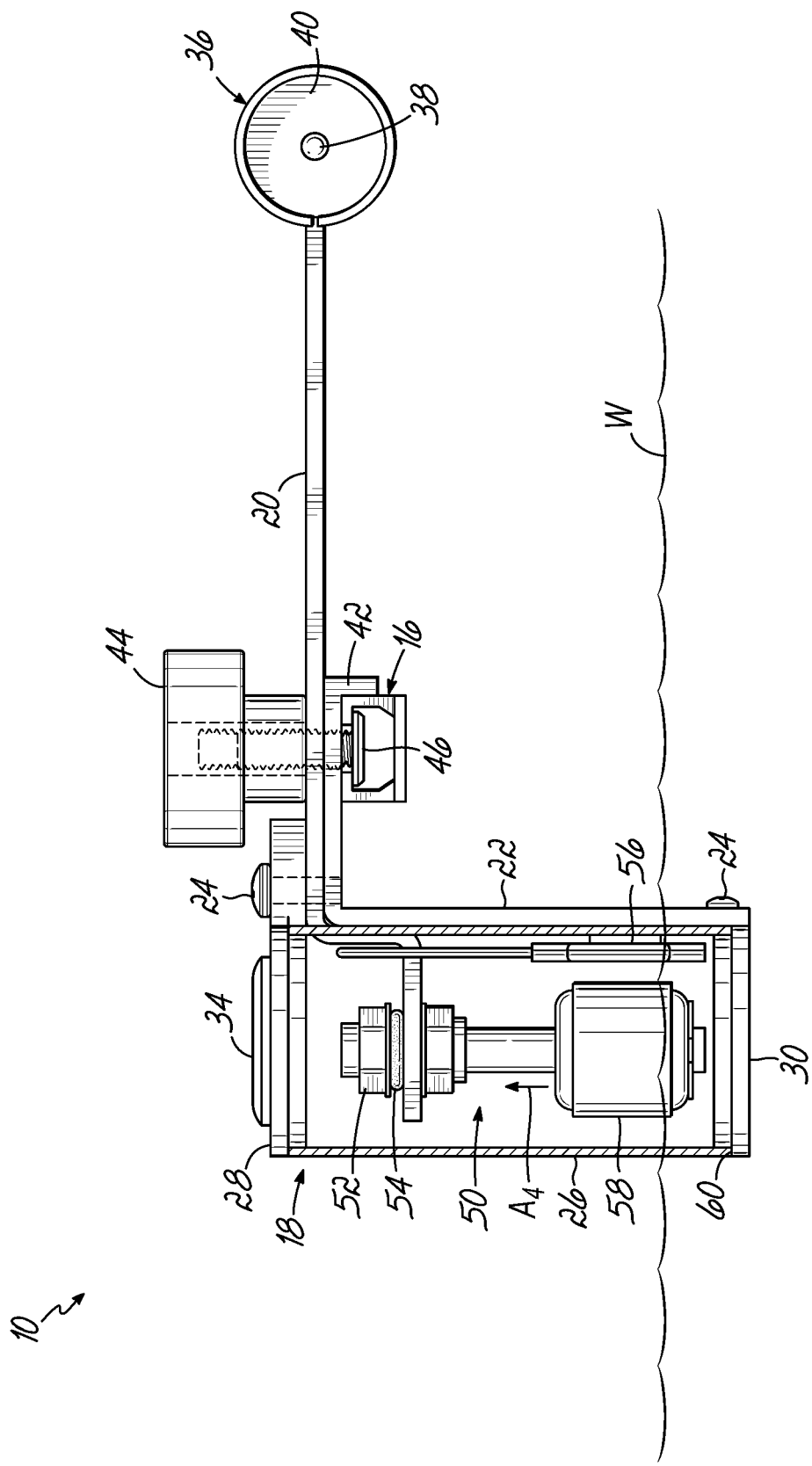
FIG. 5 is a side view of the boat trailer depth indicator of FIG. 2.
Figure 6:
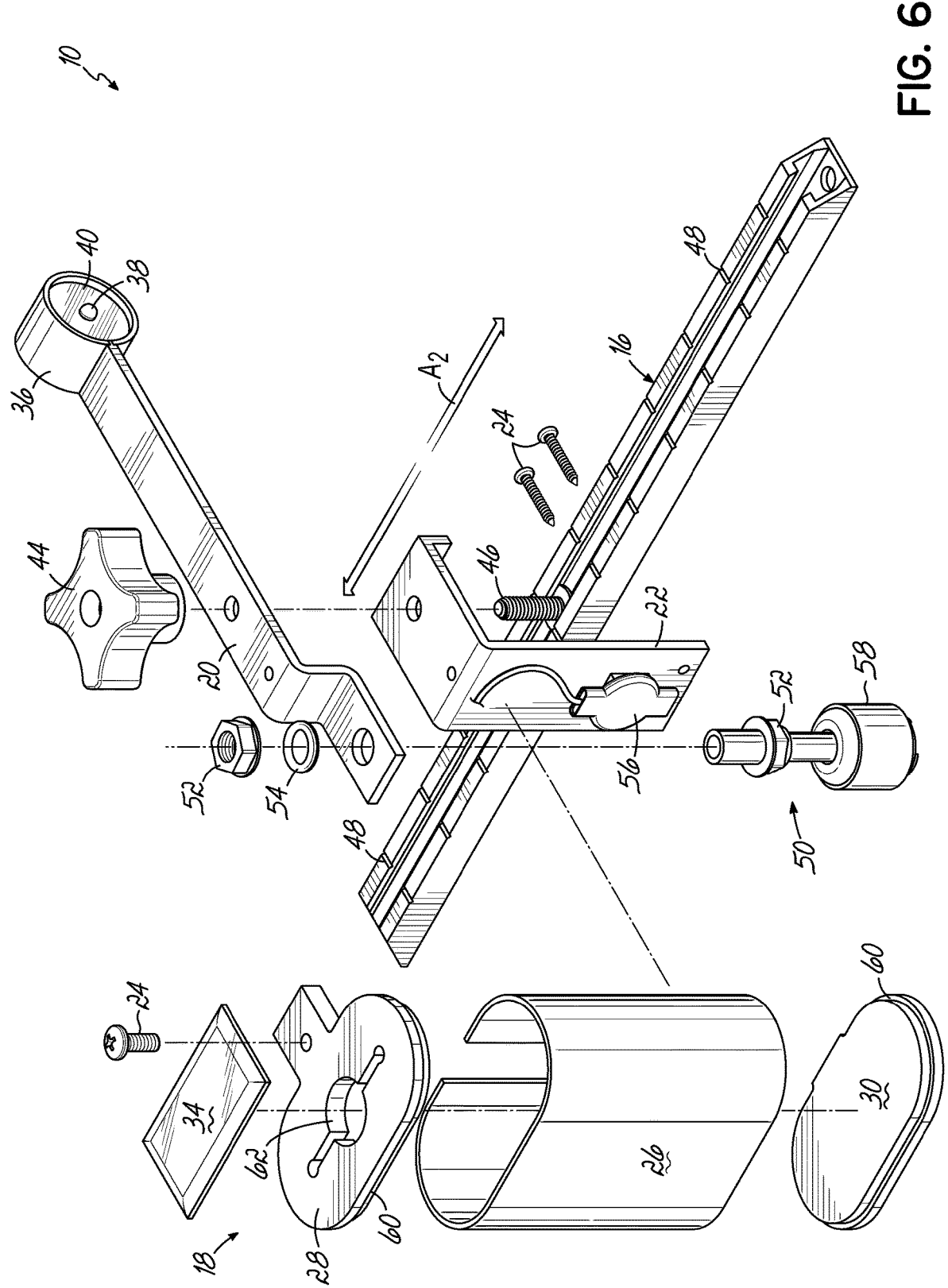
FIG. 6 is an exploded, rear perspective view of the boat trailer depth indicator of FIG. 2.
Figure 7:
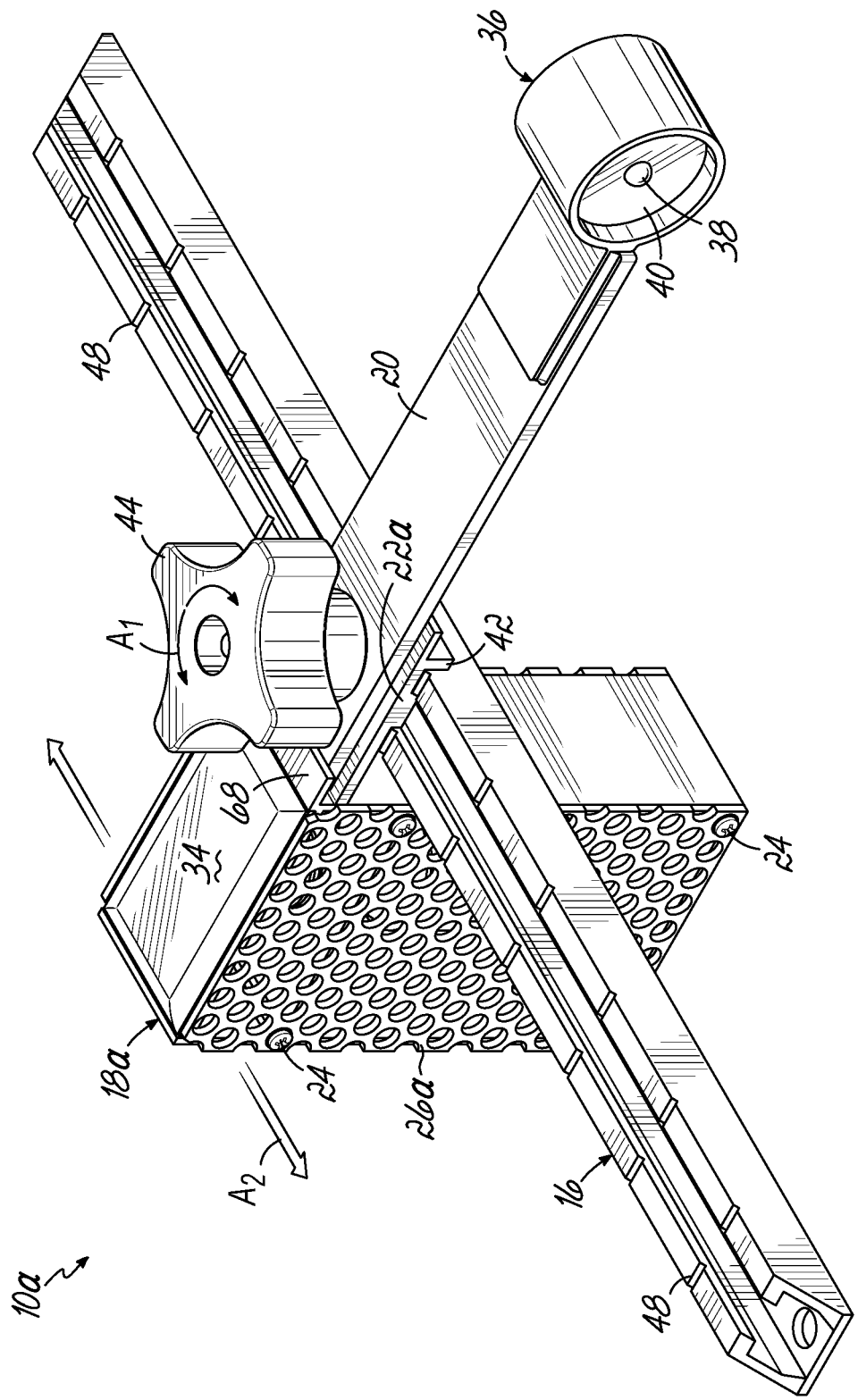
FIG. 7 is a perspective view of an alternative embodiment of the boat trailer depth indicator.
Figure 8:
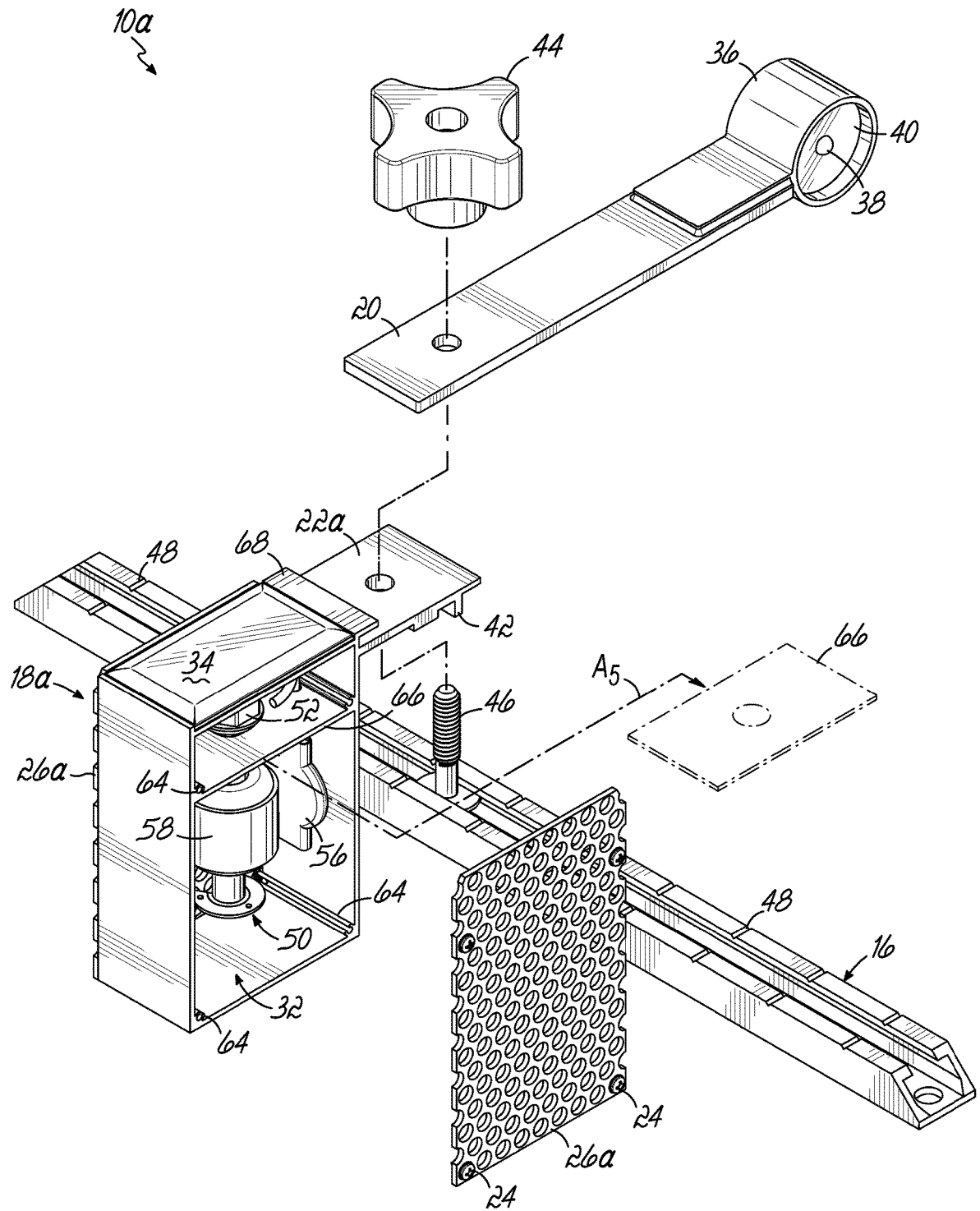
FIG. 8 is an exploded perspective view of the boat trailer depth indicator of FIG. 7.
Figure 9:
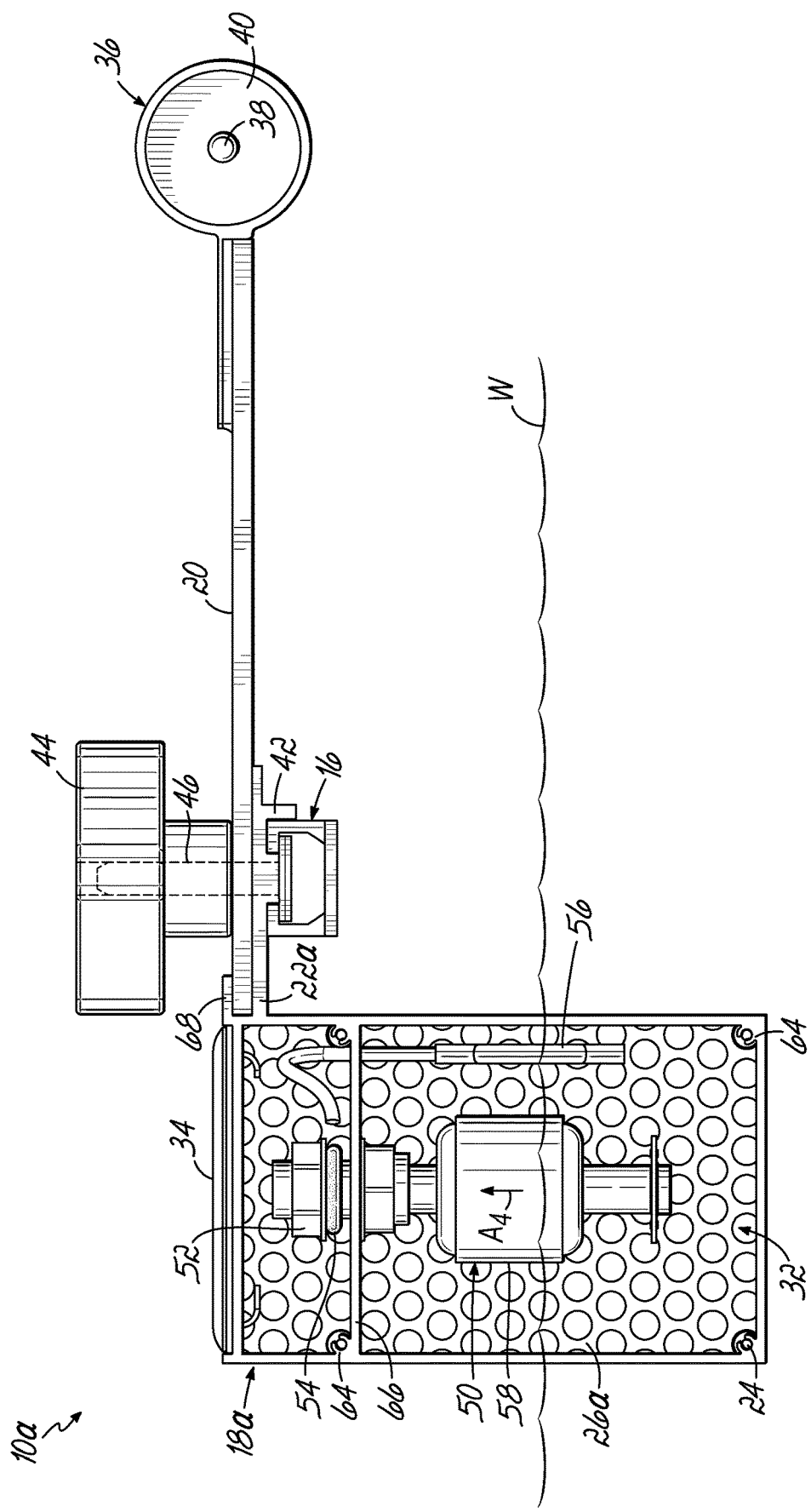
FIG. 9 is a side view of the boat trailer depth indicator of FIG. 7, with a protective cover removed for illustrative purposes.

With reference to FIGS. 1 through 10, embodiments of a boat trailer depth indicator module 10, 10a, 10b (also referred to as a "boat trailer depth indicator" or "depth indicator" herein) are shown in detail. FIGS. 2-6 show an embodiment of the boat trailer depth indicator 10. FIGS. 7-9 show an alternative embodiment of the boat trailer depth indicator 10a. Advantageously, the boat trailer depth indicator 10, 10a, 10b is an apparatus which allows a driver towing a boat trailer 12 to position the boat trailer 12 at an appropriate depth in the water to launch or recover a boat 14 without the need for an assistant on a boat ramp. Further, the boat trailer depth indicator 10, 10a, 10b removes guesswork from the boat trailer 12 positioning process. When the boat trailer 12 is located at an appropriate depth in the water, the boat trailer depth indicator 10, 10a, 10b provides a clear visual signal. Said signal communicates to the driver and also to the helmsman of the boat 14 (for example, when the boat 14 is in the water awaiting proper positioning of the boat trailer 12) that the boat trailer 12 is sufficiently submerged and ready for launch or recovery. As such, the boat trailer depth indicator 10, 10a, 10b helps to alleviate the difficulty and stress of launching and recovering a boat 14, while also providing an indicating device independent of vehicle or trailer power (and, in an embodiment, independent of communication with or to other devices) that can be installed and adjusted quickly and without the use of tools. Other advantages and technical effects of the embodiments of this invention will become evident to one skilled in the art from the following description.

Figure 1:
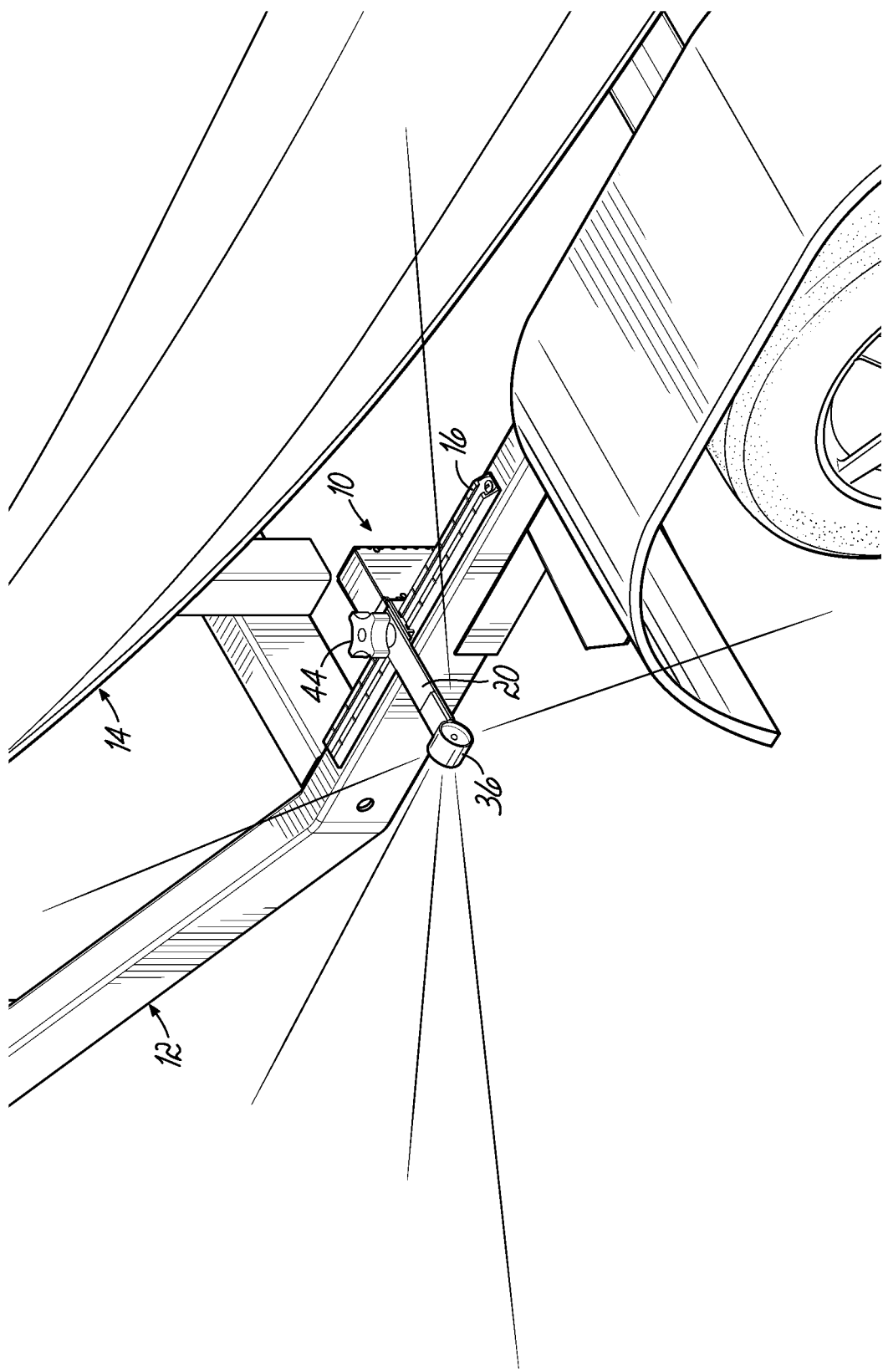
FIG. 1 is an environmental view of a boat trailer depth indicator on a boat trailer.

Beginning with reference to FIG. 1, the Figure shows an embodiment of a boat trailer depth indicator 10a mounted to a boat trailer 12 via a slide rail 16. The boat trailer depth indicator 10, 10a, 10b can be permanently or removably fixed to the slide rail 16. The slide rail 16 is fixed to the boat trailer 12 frame. The slide rail 16 can be permanently or removably fixed to the boat trailer 12 frame by mechanical fasteners such as nuts and bolts, for example, or by other similar connector elements. In an alternative embodiment, the slide rail 16 is adhered or otherwise fixed in position on the frame of the boat trailer 12 without requiring connection hardware such as fasteners or the use of tooling, further simplifying the installation process for the depth indicator 10, 10a, 10b.

Because of the flexibility afforded by a slide rail 16 mounting system, the boat trailer depth indicator 10, 10a, 10b can be used with virtually any boat trailer 12 or boat 14. A user installs the slide rail 16 onto the frame of the boat trailer 12 roughly at the location where the boat trailer 12 emerges from the water (e.g., at the water line) when the boat trailer 12 is positioned at an appropriate water depth on a boat ramp (e.g., ready for launch or recovery). The boat trailer depth indicator 10, 10a, 10b is then mounted onto the slide rail 16 at an appropriate location, as described in further detail below. Advantageously, the boat trailer depth indicator 10, 10a, 10b mounts horizontally to the boat trailer 12. Therefore, the boat trailer depth indicator 10, 10a, 10b is never in the way or impedes the launch or recovery of the boat 14. To this end, the depth indicator 10, 10a, 10b does not extend significantly vertically upward from the frame of the boat trailer 12 (as is the case in some known, existing devices) in such a manner that may be interfered with by certain boat designs or elements like fishing rods that may project outwardly from the boat 14. This provides additional flexibility to position the depth indicator 10, 10a, 10b where it is most accurate for providing useful information to a vehicle operator.

Due to the nature of the slide rail 16, once it is installed a user can adjust the position of the boat trailer depth indicator 10, 10a, 10b along the length of the slide rail 16 with ease. For example, if a boating enthusiast frequents more than one body of water, the boat trailer depth indicator 10, 10a, 10b can be adjusted on the slide rail 16 according to what the boat ramps at each body of water require, as a result of the differing slopes, etc. of certain boat ramps. Similarly, if the same boat trailer 12 is used to tow multiple boats 14 a user can adjust the location of the boat trailer depth indicator 10, 10a, 10b as is necessary for each boat 14. Upon a first launch, an operator can calibrate the boat trailer depth indicator 10, 10a, 10b for use with a particular boat 14 on a particular boat ramp by positioning the boat trailer 12 at an appropriate depth in the water, attaching the boat trailer depth indicator 10, 10a, 10b to the slide rail 16 (e.g., at the center), and positioning the boat trailer depth indicator 10, 10a, 10b and the slide rail 16 at an appropriate location on the boat trailer 12. The position of the boat trailer depth indicator 10, 10a, 10b and the slide rail 16 on the boat trailer 12 should be such that the boat trailer depth indicator 10, 10a, 10b provides a visual signal when the boat trailer 12 is at an appropriate depth in the water. Once an appropriate location is determined, an operator can affix the slide rail 16 and boat trailer depth indicator 10, 10a, 10b to the boat trailer 12. On subsequent trips to the boat ramp, a driver can rely on the boat trailer depth indicator 10 to indicate the proper level of submersion of the boat trailer 12.

Figure 2:
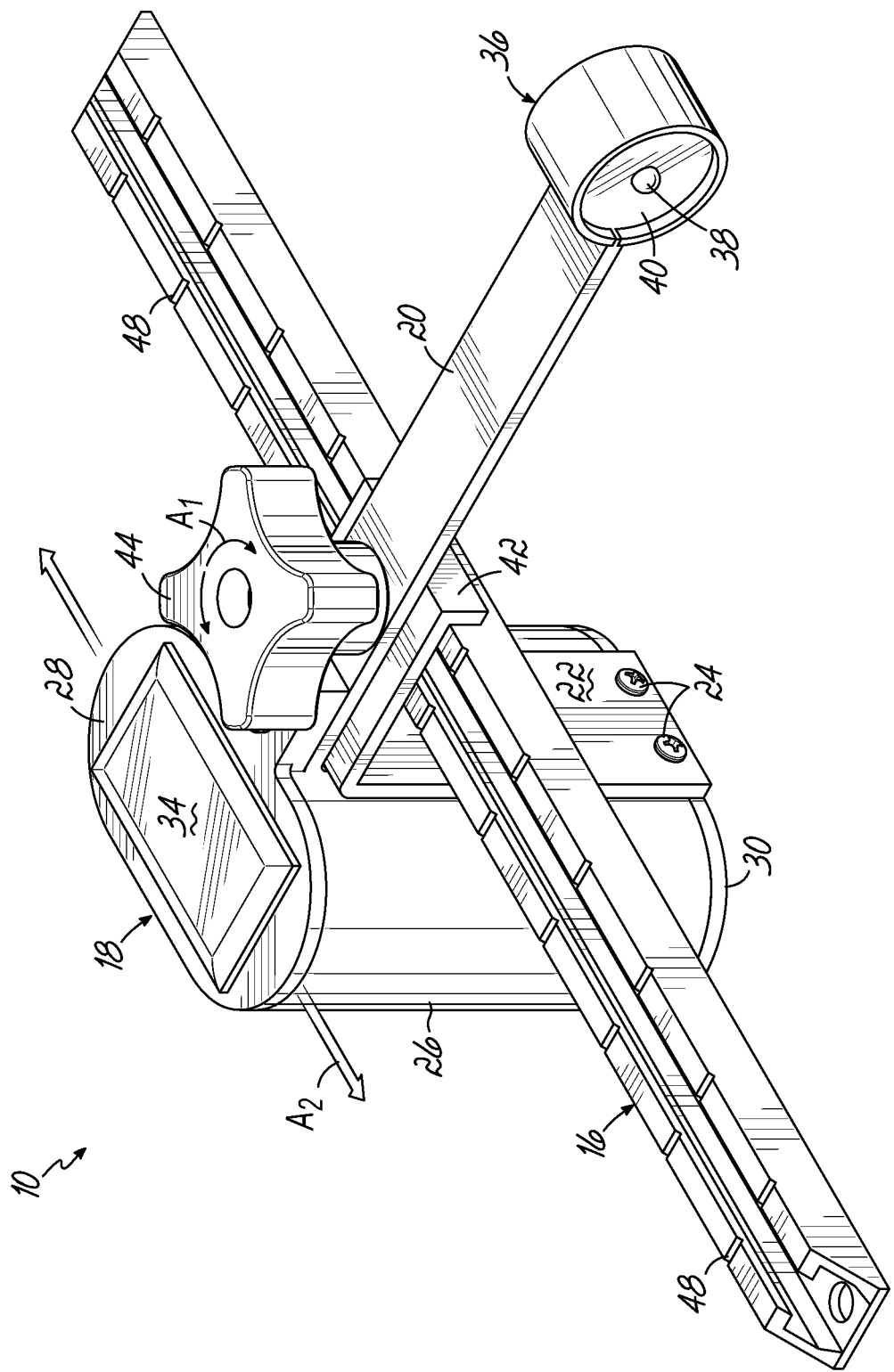
FIG. 2 is a perspective view of an embodiment of the boat trailer depth indicator.

Referring now to FIG. 2, the Figure shows a perspective view of an embodiment of a boat trailer depth indicator 10. The boat trailer depth indicator 10 includes, inter alia, a submersible enclosure 18. Extending laterally away from the submersible enclosure 18 in a generally horizontal direction is the indicator arm 20. Importantly, the extension of the indicator arm 20 in a lateral direction (away from the boat trailer 12) ensures that the boat trailer depth indicator 10 will be easily seen by the driver towing the boat trailer 12 and the helmsman of the boat 14. Connecting to both the submersible enclosure 18 and the indicator arm 20 is the mounting bracket 22. The submersible enclosure 18, the indicator arm 20, and the mounting bracket 22 are removably fixed to each other by a series of fasteners 24. The fasteners 24 may be screws or any other type of suitable mechanical fastener. While the embodiment in FIG. 2 illustrates a construction of the boat trailer depth indicator 10, it is to be understood that other constructions (such as the construction shown in FIGS. 7-9, for example) are possible. For example, the indicator arm 20 could extend in an angled orientation as opposed to a generally horizontal orientation. Further, the submersible enclosure 18, indicator arm 20, and mounting bracket 22 could be arranged in a different fashion than is depicted in FIG. 2. Further, the submersible enclosure 18, indicator arm 20, and mounting bracket 22 may be made of any suitable material that can withstand repeated interactions with fresh or saltwater. For example, aluminum or stainless steel may be chosen because these materials do not rust. In the depicted embodiment, the construction of the boat trailer depth indicator 10 is largely aluminum. Alternatively, marine-grade plastics or polymers such as high-density polyethylene (HDPE) may be used (e.g., for the protective cover 26). It is to be understood that the boat trailer depth indicator 10 could be constructed of different materials. Further, a custom extrusion process may be used for efficient production of the various parts of the boat trailer depth indicator 10.

The submersible enclosure 18 features a protective cover 26 extending a height between a top cap 28 and a bottom cap 30 to define and separate an internal cavity 32 (as shown in FIG. 3) from the exterior of the submersible enclosure 18. In the embodiment depicted in FIG. 2, the submersible enclosure 18 is the shape of an obround prism. It is to be understood that the submersible enclosure 18 could take a variety of shapes so long as the internal cavity 32 (as shown in FIG. 3) provides sufficient space for the elements contained therein, as described below.

Still referring to FIG. 2, the protective cover 26 is selectively permeable to allow liquid, such as water, to flow through the protective cover 26 relatively unimpeded. At the same time, the selectively permeable protective cover 26 prevents objects or debris from entering the internal cavity 32 (as shown in FIG. 3) of the submersible enclosure 18. In an embodiment, the protective cover 26 features a series of regular, repeating apertures in a geometric pattern to form a cage-like construction that is selectively permeable according to the size of the apertures. It will be understood that alternative arrangements may be substituted to achieve selective permeability of the protective cover 26.

On a face opposing the internal cavity 32, the top cap 28 features a power source in the form of a solar (or photovoltaic) cell 34. The solar cell 34 converts light energy from the sun or another source into electricity by virtue of the photoelectric effect. Said electricity is used to power the boat trailer depth indicator 10. Advantageously, the inclusion of the solar cell 34 on the boat trailer depth indicator 10 allows the boat trailer depth indicator to operate independently of any external power source (e.g., from the boat trailer 12 or the vehicle towing the boat 14). As such, the boat trailer depth indicator 10 is likely easier to use than known, existing devices because the boat trailer depth indicator 10 does not need to be connected to external power, as is the case with some known devices. Electricity from the solar cell 34 is routed to the appropriate places within the boat trailer depth indicator 10 by a circuit board (not shown) located within the top cap 28. In an embodiment, the circuit board may be integrated with the top cap 28. The circuit board may be a 6 mm E-panel commercially available for purchase. In an alternative embodiment, the solar cell 34 may be replaced or supplemented with a rechargeable, removable battery. The rechargeable battery could be stored within the submersible enclosure 18 and removed as needed to be charged. Regardless of the power source element, the depth indicator 10 advantageously provides the power source so as to be stored within the internal cavity 32 for space-efficiency and protection of these elements (the power source element must still be configured to be submersible, of course). The depth indicator 10 therefore simplifies the installation process by avoiding the need to connect via wiring or the like to an external power supply, such as on the boat 14 or from the towing vehicle.

Still referring to FIG. 2, the Figure shows an indicator arm 20 extending outwardly from the submersible enclosure 18. At an end of the indicator arm 20, opposite the submersible enclosure 18, is an indicator housing 36. In an embodiment, the indicator housing 36 is in the shape of a cylinder with the indicator arm 20 intercepting the indicator housing 36 on the curved exterior surface of the indicator housing 36. It is understood that the indicator housing 36 may take on alternative shapes and may be alternatively fixed to the indicator arm 20. The indicator housing 36 contains an indicator 38. In the embodiment shown, the indicator 38 is located proximate to the center of a circular face of the cylindrical indicator housing 36. The indicator arm 20 extends outwardly from the submersible enclosure 18 to a sufficient horizontal extent (e.g., distance from the boat trailer 12) such that the indicator 38 may be typically located in the field of vision of both the driver towing the boat trailer 12 via a mirror or the like (e.g., during launch or recovery) and the helmsman of the boat 14 (e.g., during recovery).

The indicator 38 is positioned within the indicator housing 36 such that the indicator 38 can be seen from either side of the boat trailer depth indicator 10. For example, the indicator 38 could be seen by the driver of the tow vehicle in a side mirror and by the helmsman of the boat 14 in the water near the boat ramp. Alternatively, the indicator housing 36 may feature two indicators 38—one on each face of the indicator housing 36. In practice, either embodiment allows both the driver of the vehicle towing the boat trailer 12 and a helmsman launching or recovering the boat 14 to see the indicator 38, despite being on opposite sides of the boat trailer depth indicator 10. Further, the indicator housing 36 features a lens 40. The lens 40 fits onto the face of the indicator housing 36 and covers the indicator 38. The lens 40 is intended to both provide a covering to protect the indicator 38 from direct, incidental contact and to increase the visibility of the indicator 38 (e.g., by reflection and distribution). In an embodiment, the indicator 38 is an LED. In a further embodiment, the indicator 38 is a high-intensity LED. In yet a further embodiment, the indicator 38 is preferably blue in color (such as a 3V blue LED).

Still referring to FIG. 2, the Figure shows the mounting bracket 22 connecting to both the submersible enclosure 18 and the indicator arm 20. In an embodiment, the mounting bracket 22 is substantially L-shaped so as to form a portion of the submersible enclosure 18 and support a portion of the indicator arm 20. At one end, the mounting bracket 22 is removably secured to the bottom cap 30 of the submersible enclosure 18 via fasteners 24. Opposite the location where the bottom cap 30 is fastened to the mounting bracket 22, a portion of the indicator arm 20 sits atop the mounting bracket 22. The top cap 28 of the submersible enclosure 18 overlaps part of the intersection of the mounting bracket 22 and the indicator arm 20. A fastener 24 is threaded through all three of the mounting bracket 22, indicator arm 20, and top cap 28 (as shown in FIG. 5). This fastener 24 secures the top cap 28 of the submersible enclosure 18 to the mounting bracket 22 and sandwiches the indicator arm 20 therebetween. It is to be understood that alternative constructions and combinations of the submersible enclosure 18, indicator arm 20, and mounting bracket 22 are possible in other embodiments consistent with this disclosure.

The mounting bracket 22 serves as an interface between the boat trailer depth indicator 10 and the slide rail 16. The mounting bracket 22 features a lip 42 at an end of the mounting bracket 22 that contacts the slide rail 16, opposite the end of the mounting bracket 22 that is fastened to the bottom cap 30. The lip 42 projects downwardly from the mounting bracket 22 such that it allows a user to line up the boat trailer depth indicator 10 with one edge of the slide rail 16 when adjusting the location of the boat trailer depth indicator 10. Further, the lip 42 provides for additional surface contact between the mounting bracket 22 and the slide rail 16 to reinforce the connection between the slide rail 16 and the mounting bracket 22. To adjust the location of the boat trailer depth indicator 10, an adjustment knob 44 is located on top of the indicator arm 20 in this embodiment. In such an embodiment, an adjustment screw 46 is threaded through the mounting bracket 22, through the indicator arm 20, and into the bottom of the adjustment knob 44 (as shown in FIG. 5). It will be understood that alternate constructions are available. The head of the adjustment screw 46 sits in and contacts a channel of the slide rail 16. In this way, a user can adjust the position of the boat trailer depth indicator 10 by loosening and tightening the adjustment knob 44 by hand, without the use of any separate tools. In this regard, the only time separate tools are required for the boat trailer depth indicator 10 is when installing the slide rail 16 onto the frame of the boat trailer 12, which only occurs once and before a first use of the depth indicator 10, and only in embodiments where connection hardware is used (this is not always necessary as set forth above). This configuration allows for rapid repositioning and removal or replacement of the depth indicator 10 as desired by the boat 14 or trailer 12 owner.

Tightening the adjustment knob 44 at a position on the slide rail 16 causes the head of the adjustment screw 46 to grip the underside of the channel of the slide rail 16. To move the boat trailer depth indicator 10, a user simply has to loosen the adjustment knob 44 (as shown by arrow A1), thereby releasing the adjustment screw 46 from rigid contact with the slide rail 16, slide the boat trailer depth indicator 10 along the slide rail 16 (as shown by arrow A2), and then re-tighten the adjustment knob 44 (as shown by arrow A1) at a different chosen location on the slide rail 16. The head of the adjustment screw 46 is maintained within the elongate channel defined by the slide rail 16 during this movement, and the ends of the slide rail 16 are open to allow for removal of the depth indicator 10 from the slide rail 16 when desired. In an embodiment, the slide rail 16 features notches 48 at regular intervals along the length of the slide rail 16. The notches 48 may be used as references to mark an appropriate location for the boat trailer depth indicator 10 on the slide rail 16, such as when the depth indicator 10 may be removed and re-installed between uses.

Figure 3B:
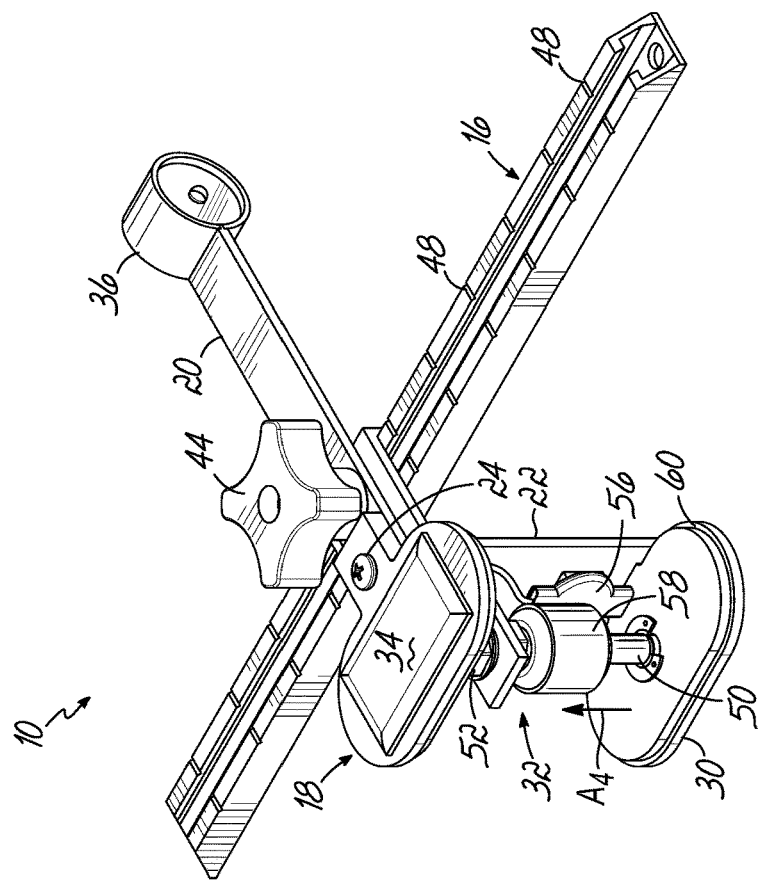
FIG. 3B is a rear perspective view of the boat trailer depth indicator of FIG. 2, similar to FIG. 3A, but with the float switch moved to a second position.
Figure 3A:
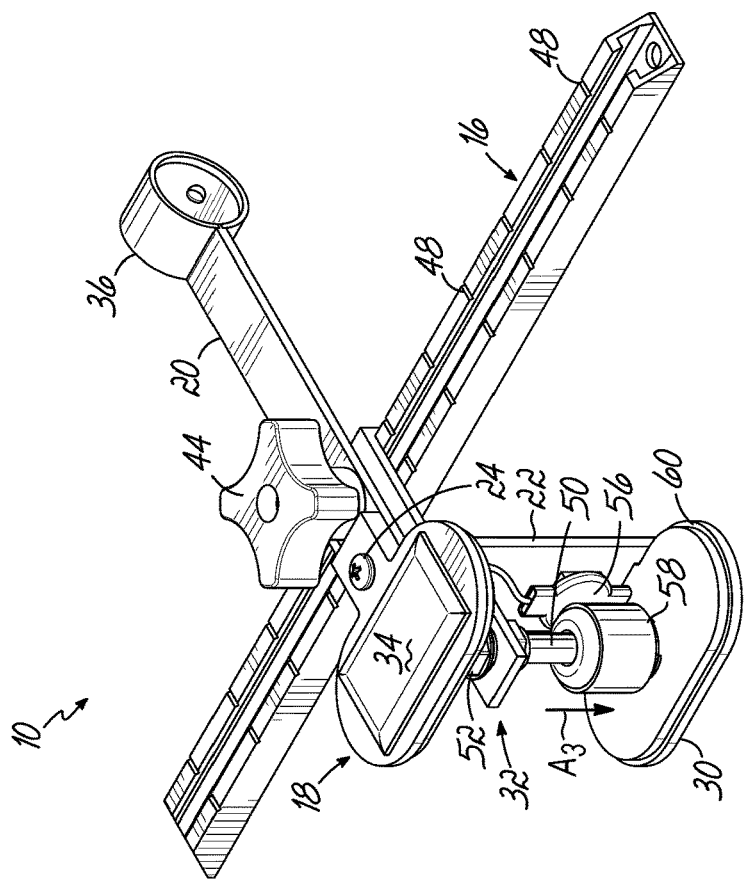
FIG. 3A is a rear perspective view of the boat trailer depth indicator of FIG. 2, with the protective cover removed for illustrative purposes and a float switch in a first position.

Referring now to FIGS. 3A and 3B, the Figures show rear perspective views of an embodiment of a boat trailer depth indicator 10 with the protective cover 26 removed to better show the components held within the internal cavity 32. The Figures show an actuation element, in the form of a float switch 50, attached to an end of the indicator arm 20 (located within the submersible enclosure 18, opposite the indicator housing 36). The float switch 50 is removably attached to the indicator arm 20 via a locking nut 52. The locking nut 52 is threaded onto an end of the float switch 50 and sandwiches the end of the indicator arm 20 between the float switch 50 and the locking nut 52. Located between the locking nut 52 and the top of the indicator arm 20 is an O-ring 54. The O-ring 54 prevents the locking nut 52 from directly contacting the top of the indicator arm 20 and provides for a snug, secure fit. In an alternative embodiment, the float switch 50 is replaced with a capacitive touch sensor or an optical infrared liquid sensor as an alternative type of actuation element. The capacitive touch sensor or the optical infrared liquid sensor would serve the same or a similar function as the float switch 50; however, the capacitive touch sensor and optical infrared liquid sensor advantageously do not feature moving parts.

Both FIGS. 3A and 3B also show a battery 56 attached to a side of the mounting bracket 22 that faces toward the internal cavity 32 of the submersible enclosure 18. The battery 56 is covered by a protective wrap to protect the battery 56 from exposure to water (or any other elements) that may enter the submersible enclosure 18. In the illustrated embodiment, the battery 56 is used to store energy captured by the solar cell 34. When the float switch 50 is activated, the battery 56 provides power to the indicator 38. In an alternative embodiment, the boat trailer depth indicator 10 may not feature a solar cell 34 on the top of the submersible enclosure 18. In that instance, the battery 56 would no longer store energy gathered by the solar cell 34. Instead, the battery 56 could be a removable and replaceable battery such as a button cell battery. Alternatively, the battery 56 could be a reusable and rechargeable battery (or power pack) that would need to be charged externally before being placed in the submersible enclosure 18. Advantageously, the battery 56 is an independent energy source. The battery 56 does not have to rely on power from the boat trailer 12 or the vehicle towing the boat trailer 12 to power to the boat trailer depth indicator 10.

Starting with FIG. 3A, the Figure shows a float 58 on the float switch 50 at a resting position at the bottom of the float switch 50 (illustrated by arrow A3). This position is the default position for the float 58 as a result of gravity. The float 58 is constructed of a material that floats in water. Without water in the submersible enclosure 18, the float 58 will remain at the bottom of the float switch 50. The float 58 is activated or deactivated by changes in the water level within the submersible enclosure 18. Thus, the float switch 50 will remain inactive until a sufficient amount of water is introduced into the submersible enclosure 18 to cause the float 58 to rise to the top of the float switch 50.

Turning to FIG. 3B, the Figure shows float 58 in an elevated position at the top of the float switch 50 (illustrated by arrow A4). When water is introduced to the submersible enclosure 18, the float 58 leaves its position at the bottom of the float switch 50 and begins to float towards the top of the float switch 50 due to the buoyancy of the float 58 in the water. When the water reaches a sufficient height in the submersible enclosure 18 (e.g., when the boat trailer depth indicator 10 reaches a sufficient water depth), the float 58 will reach a position at the top of the float switch 50. The float 58 reaching this elevated position activates the float switch 50. The active float switch 50 completes a circuit and causes the indicator 38 to become illuminated by enabling an operative power supply connection between the battery 56 (and/or solar cell 34) and the indicator 38 in this position. In embodiments including an alternative to the float switch 50 such as the capacitive touch sensor or optical infrared liquid sensor described above, the immersion of the capacitive touch sensor or the detection of water by the optical infrared liquid sensor when water enters the submersible enclosure 18 activates a circuit connection to power the indicator 38 with the battery 56. In this way, the capacitive touch sensor or optical infrared liquid sensor would operate in much the same way as the float switch 58. Further, a capacitive touch sensor and/or an optical infrared liquid sensor could be used in addition to a float switch 50. For example, the float switch 50 and a capacitive touch sensor or an optical infrared liquid sensor could be configured to require that both the float switch 50 and the capacitive touch sensor or the optical infrared liquid sensor be activated to complete a circuit and cause the indicator 38 to become illuminated (e.g., forming an AND gate). Such an arrangement, e.g., employing a float switch 50 and a capacitive touch sensor or an optical infrared liquid sensor, would function to help prohibit or at least minimize battery drainage (e.g., by the capacitive touch sensor and/or the optical infrared liquid sensor).

It will be understood that the indicator arm 20 is wired or otherwise configured to carry the power signal between the battery 56 and the indicator 38 when the circuit is closed as described here. Power may be delivered from the solar cell 34 or battery 56 to the indicator 38 via a wire (not shown) on the underside of the indicator arm 20. Other modes of power delivery to the indicator 38 are possible. For example, the indicator arm 20 could have a hollow construction such that a wire running from the submersible enclosure 18 to the indicator housing 36 could be concealed within the indicator arm 20. Alternatively, the indicator arm 20 could be fabricated with a channel running the length of the indicator arm 20 such that a wire could be at least partially concealed within said channel. Further, in an alternative embodiment, the indicator arm 20 may be wrapped in a protective sleeve that would hide a wire from view. The indicator arm 20 may also be formed from conductive material that transmits the power signal to the indicator 38 when the power supply from the battery 56 is enabled (e.g., upon sufficient submersion of the depth indicator 10). When the indicator 38 becomes illuminated this indicates to the driver towing the boat trailer 12 that the boat trailer 12 is at an appropriate depth in the water. This also indicates to the helmsman of the boat 14 that the boat trailer 12 is at an appropriate depth in the water for the boat 14 to be recovered.

Referring now to FIGS. 3A and 3B, when the water level in the submersible enclosure 18 decreases (e.g., when the boat trailer 12 is removed from the water), the float 58 will return by gravity to its default, resting position at the bottom of the float switch 50 (as illustrated by arrow A3 in FIG. 3A). As such, the float switch 50 will be deactivated. The previously completed circuit will be broken, and the indicator 38 will no longer receive power and thus will not light up any longer. Likewise, embodiments including a capacitive touch sensor also open the circuit to stop power supply to the indicator 38 when water drains from the submersible enclosure 18 such that the water no longer completes the circuit across the capacitive touch sensor. This signals to the driver towing the boat trailer 12 and the helmsman of the boat 14 that the boat trailer 12 is not at an appropriate depth in the water for launch or recovery.

Figure 4:
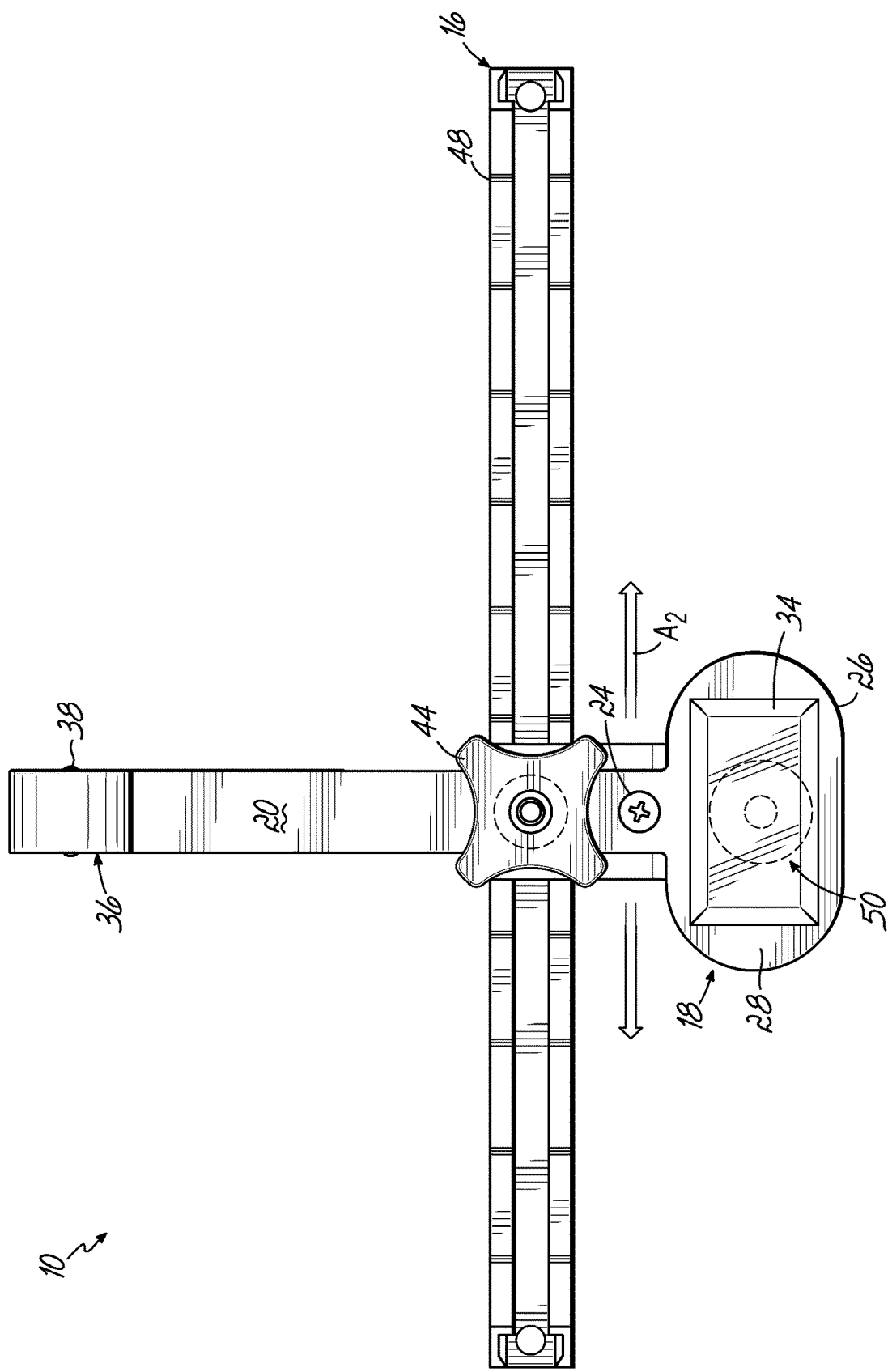
FIG. 4 is a top view of the boat trailer depth indicator of FIG. 2.

Referring now to FIG. 4, the Figure shows a top view of the boat trailer depth indicator 10. The Figure illustrates how the boat trailer depth indicator 10 can be adjusted along the length of slide rail 16. A user can position and re-position the boat trailer depth indicator 10 anywhere on the slide rail 16, as shown by arrow A2, using the adjustment knob 44 (as previously described). If a user desires more flexibility, the user may use a longer slide rail 16 such that the boat trailer depth indicator 10 can be positioned in more locations along a length of a boat trailer 12 frame. For example, if a user utilizes the same boat trailer 12 for multiple boats 14, then it may be advantageous for the user to have more options for the placement of the boat trailer depth indicator 10 (e.g., with a longer slide rail 16).

Referring now to FIG. 5, the Figure shows a side view of an embodiment of the boat trailer depth indicator 10 in water W. This Figure illustrates how the submersible enclosure 18, indicator arm 20, and mounting bracket 22 are assembled together to form the boat trailer depth indicator 10. As described above in reference to FIG. 2, both the top cap 28 and bottom cap 30 are secured to the mounting bracket 22 with fasteners 24. The protective cover 26 is sandwiched between the top cap 28 and the bottom cap 30 to form the submersible enclosure 18. The protective cover 26 is held in place via a friction fit between the top cap 28 and the bottom cap 30. For example, the protective cover 26 may engage with grooves 60 formed around the periphery of the top cap 28 and the bottom cap 30 to further secure the protective cover 26 between the top cap 28 and the bottom cap 30.

Further, FIG. 5 clarifies how the indicator arm 20 is secured within the submersible enclosure 18. It will be understood that alternative constructions are possible. The indicator arm 20 is secured in at least two locations on the indicator arm 20. First, the indicator arm 20 is secured between the top cap 28 of the submersible enclosure 18 and the mounting bracket 22. A fastener 24 holds all three of the parts together. Second, the indicator arm 20 is further secured to the mounting bracket 22 by the adjustment knob 44 and adjustment screw 46. The adjustment screw 46 threads through the mounting bracket 22, the indicator arm 20, and into the bottom of the adjustment knob 44. When engaged (e.g., tightened), the adjustment knob 44 and the adjustment screw 46 also squeeze the mounting bracket 22 and the indicator arm 20 together.

Referring now to FIG. 6, the Figure shows an exploded, rear perspective view of the boat trailer depth indicator 10. Helpfully, the Figure illustrates how an embodiment of the boat trailer depth indicator 10 can be constructed. Further, the Figure provides some additional details about the embodiment that could not be gleaned from previous Figures. Specifically, the Figure shows the top cap 28 and the bottom cap 30 featuring a groove 60 around the perimeter of each respective cap. This groove 60 provides for the protective cover 26 to be correctly aligned with the top cap 28 and bottom cap 30. Additionally, as can be seen in the Figure, in an embodiment the top cap 28 features a cut-out 62. This cut-out 62 serves several purposes. The cut-out 62 provides a location for the circuit board in the top cap 28 to be housed. Furthermore, the cut-out 62 allows for wiring from the solar cell 34 to pass through the top cap 28, into the submersible enclosure 18, and to the battery 56 or the indicator 38.

Referring now to FIGS. 7-9, the Figures show an alternative embodiment of the boat trailer depth indicator 10a. The construction of the boat trailer depth indicator 10a depicted in FIGS. 7-9 differs in some aspects from that of the boat trailer depth indicator 10 depicted in FIGS. 2-6. Particularly, the submersible enclosure 18a and the connection between the enclosure 18a and the mounting bracket 22a in this embodiment are different.

Beginning with reference to FIG. 7, the Figure shows a perspective view of the alternative embodiment of a boat trailer depth indicator 10a. The boat trailer depth indicator 10a functions to adjust in position on the slide rail 16 like the boat trailer depth indicator 10 (of FIGS. 2-6) as illustrated by arrows A1 and A2. However, the submersible enclosure 18a of FIG. 7 has a different construction than the submersible enclosure 18 of FIGS. 2-6. Particularly, the submersible enclosure 18a of the alternative embodiment is shaped roughly like a rectangular prism. Further, a portion of the submersible enclosure 18a (e.g., excluding the protective covers 26a) is of unitary construction and may be formed through an extrusion process to achieve the desired shape of the enclosure 18a. Though this embodiment depicts a particular form, it is to be understood that the submersible enclosure 18a could take on different forms (e.g., in addition to the forms shown in FIGS. 2-6 and 7-9, respectively) while performing the same function, as described above with respect to FIGS. 2-6.

Regardless, faces of the prism-shaped submersible enclosure 18a are covered by protective covers 26a. As shown, the protective covers 26a of this embodiment are substantially flat plates (or sheets) mounted to opposing faces of the submersible enclosure 18a. Like the protective covers 26 described above with reference to FIGS. 2-6, the protective covers 26a of FIG. 7 are selectively permeable to allow liquid, such as water, to flow through the protective cover 26a. The selectively permeable protective cover 26a also serves prevents objects or debris from entering the internal cavity 32 (as shown in FIGS. 8 and 9) of the submersible enclosure 18a. In an embodiment, the protective cover 26a features a series of regular, repeating apertures in a geometric pattern. The protective cover 26a is selectively permeable according to the size of the apertures. It will be understood that alternative arrangements may be substituted to achieve selective permeability of the protective cover 26a. As will be described in greater detail with respect to FIGS. 8 and 9, the protective covers 26a are removably fixed to the submersible enclosure 18a by fasteners 24.

Turning to FIG. 8, the Figure shows an exploded perspective view of the boat trailer depth indicator 10a. In the exploded view, the fastener receptacles 64, to which the fasteners 24 that removably fix the protective covers 26a to the submersible enclosure 18a are connected, can be seen. A number of fastener receptacles 64 are distributed about the internal cavity 32 of the submersible enclosure 18a. For example, in the depicted embodiment, there are four fastener receptacles 64. However, it should be understood that the number of fastener receptacles 64 necessary to secure the protective cover 26a to the submersible enclosure 18a may vary. In the depicted embodiment, the fastener receptacles 64 are substantially cylindrical channels extending from one face of the submersible enclosure 18a to another (e.g., from one face covered by a protective cover 26a to another). The fastener receptacles 64 are configured to receive fasteners 24 so that the protective covers 26a are secured to the submersible enclosure 18a. Particularly, fasteners 24 (e.g., #8 sheet metal screws) are inserted through apertures of the protective cover 26a and engage with the fastener receptacles 64 (e.g., where the fasteners 24 self-tap) thereby removably securing the protective cover 26a to the submersible enclosure 18a.

Further, the Figure shows the float mount plate 66 within the internal cavity 32 of the submersible enclosure 18a. In the depicted (alternative) embodiment, the float switch 50 is mounted through an aperture in the float mount plate 66 by a locking nut 52, much like the float switch 50 in the embodiment of FIGS. 2-6 is mounted to an end of the indicator arm 20. The float mount plate 66 may be secured to the submersible enclosure 18a (e.g., integrally formed with or otherwise fixed to the submersible enclosure 18a) or the float mount plate 66 may be removeable from the submersible enclosure 18a. As illustrated by arrow A5, if the float mount plate 66 is removeable from the submersible enclosure 18a, the float mount plate 66 can slide from the submersible enclosure 18a such that the float switch 50 can be more easily installed or replaced, for example. Further, if the float mount plate 66 is removeable, the submersible enclosure 18a features slots (not shown) for receiving ends of the float mount plate 66 therein. The removeable float mount plate 66 is held in place by the protective covers 26a removably secured on opposing faces of the submersible enclosure 18a.

Additionally, in the embodiment depicted in FIG. 8, the mounting bracket 22a, which interfaces with the slide rail 16, is integrated with and extends from the submersible enclosure 18a. In other words, the submersible enclosure 18a and the mounting bracket 22a are of unitary construction in this embodiment (e.g., shown in FIGS. 7-9), meaning these elements are integrally formed as a unitary piece. In contrast, in the embodiment of FIGS. 2-6 the mounting bracket 22 is a separate part that is fastened to and forms part of the submersible enclosure 18. It is to be understood that further variations of the mounting bracket 22, 22a and its relation to the submersible enclosure 18, 18a are contemplated. The indicator arm 20 sits atop the mounting bracket 22a. An end of the adjustment screw 46 passes through an aperture in the mounting bracket 22a and the indicator arm 20. The indicator arm 20 is sandwiched, and thus secured, between the mounting bracket 22a and the adjustment knob 44 when the adjustment knob 44 is threaded onto the end of the adjustment screw 46. A projection 68 extending from the submersible enclosure 18a and located a distance above the mounting bracket 22a further secures an end of the indicator arm 20 to the mounting bracket 22a and submersible enclosure 18a, e.g., it defines an open slot with the mounting bracket 22a to receive an end of the indicator arm 20.

Referring now to FIG. 9, the Figure shows a side view of the boat trailer depth indicator 10a in water W, with one of the protective covers 26a removed to better show the components within the submersible enclosure 18a. Particularly, the arrangement of components within the submersible enclosure 18a are depicted. The solar cell 34 and the battery 56 are secured to the submersible enclosure 18a by VHB tape, for example. It is to be understood that the battery 56 and solar cell 34 may be secured to the submersible enclosure 18a in other ways. In the illustrated embodiment, the battery 56 is shown secured to a side of the submersible enclosure 18a. However, the battery 56 could also be secured to the top of the submersible enclosure 18a, opposite the solar cell 34. Further, the Figure shows the indicator housing 36 secured to the indicator arm 20. The indicator housing 36 can be secured to the indicator arm 20 by VHB tape, for example. It is to be understood that the indicator housing 36 could be secured to the indicator arm 20 in other ways. In contrast to the embodiment depicted in FIGS. 2-6, in the embodiment depicted in this Figure (e.g., FIG. 9) the indicator housing 36 is not integrated with the indicator arm 20.

Figure 10:
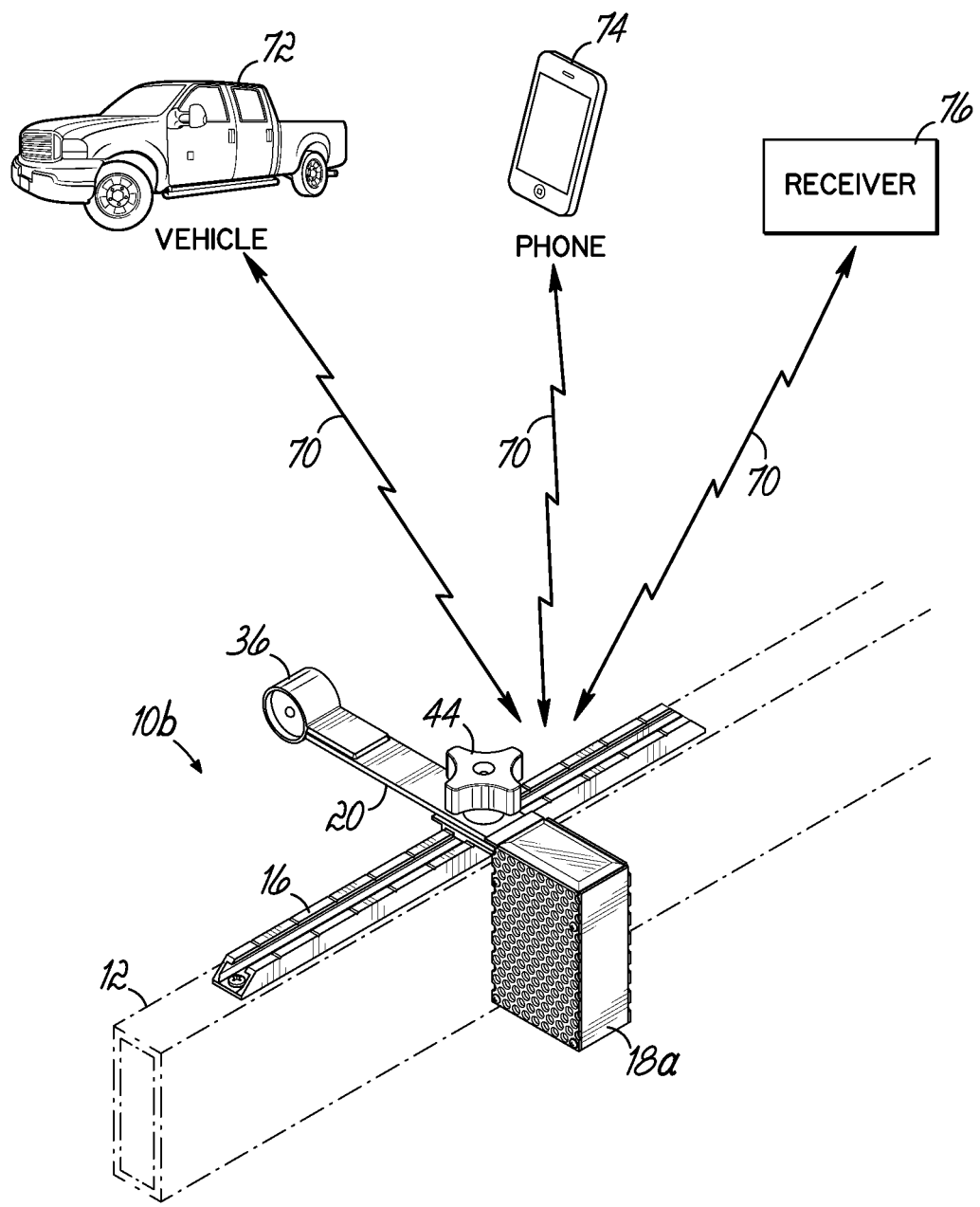
FIG. 10 is an environmental view of a further alternative embodiment of the boat trailer depth indicator, showing further communications from the boat trailer depth indicator.

Turning to FIG. 10, the Figure shows a further alternative embodiment of the boat trailer depth indicator 10b, which may be combined with the other described embodiments or used separately. In this further alternative embodiment, the boat trailer depth indicator 10b can provide additional ways (e.g., communications beyond the visual signal of the indicator 38) of notifying a user that a boat trailer 12 is sufficiently submerged and ready for launch or recovery. The boat trailer depth indicator 10b can send remote signals 70 either in addition to or in lieu of the visual signal of the indicator 38. For example, the boat trailer depth indicator 10b could send a remote signal 70 (e.g., by Wi-Fi, Bluetooth, etc.) to a vehicle 72, phone 74, and/or other receiver 76 to notify a user that the boat trailer 12 is sufficiently submerged. In the case of a phone 74, the remote signal 70 may be in the form of a text (e.g., SMS) message, phone call, or mobile app notification (e.g., push notification, etc.).

Advantageously, the boat trailer depth indicator 10, 10a, 10b described herein avoids the problems of other known devices. For example, the power source (e.g., solar cell 34 and/or battery 56) of the boat trailer depth indicator 10, 10a, 10b being located on or in the submersible enclosure 18, 18a allows for the boat trailer depth indicator 10, 10a, 10b to operate independently from the boat trailer 12 or the tow vehicle. The boat trailer depth indicator 10, 10a, 10b described herein does not need to rely on external power to function as is the case with some known devices. Further, the use of a slide rail 16 mounting system allows for the boat trailer depth indicator 10, 10a, 10b to be quickly and easily mounted, adjusted, or removed without the use of tools. Other known devices require the use of tools for installation, adjustment, or removal. Additionally, the indicator arm 20 extends laterally or generally horizontally (or, in an embodiment, only horizontally) outward from the boat trailer depth indicator 10, 10a, 10b. This permits the indicator 38 to be viewed by both the driver of the tow vehicle and helmsman of the boat 14 without the indicator arm 20 interfering with the boat 14 or boat trailer 12 (or extensions thereof and/or items carried on same), as is the case with some known devices. These, other features, and combinations thereof (as described in the preceding paragraphs) improve upon the shortcomings of known devices. Other advantages and technical effects of the embodiments of this invention will become evident to one skilled in the art from the preceding description.

While the present invention has been illustrated by the description of various embodiments and while these embodiments have been described in some detail, it is not the intention of the Applicant to restrict or in any way limit the scope of the invention to such detail. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A boat trailer depth indicator module configured to be removably coupled to a slide rail attached to a boat trailer, the depth indicator module comprising:
    a submersible enclosure containing an actuation element located within an internal cavity at least partially surrounded by a protective cover, the protective cover configured to allow communication of water into and out of the internal cavity;
    an indicator arm removably coupled to the submersible enclosure, the indicator arm extending laterally and outwardly from the submersible enclosure, the indicator arm including an indicator at a free end, the indicator configured to provide a visual signal;
    a power source mounted to and located on the submersible enclosure, the power source selectively powering the indicator; and
    a mounting bracket connecting and supporting the submersible enclosure and the indicator arm relative to one another, the mounting bracket configured to selectively engage the slide rail to secure the indicator module in a position relative to the slide rail,
    wherein an amount of water entering the submersible enclosure activates the actuation element and operatively connects the power source to the indicator thereby illuminating the indicator to provide the visual signal.

2. The boat trailer depth indicator module of claim 1, the submersible enclosure further comprising:
    a mounting plate, the actuation element mounted to the mounting plate within the submersible enclosure.

3. The boat trailer depth indicator module of claim 2, wherein the mounting plate is removeable from the submersible enclosure.

4. The boat trailer depth indicator module of claim 1, the actuation element comprising a float switch.

5. The boat trailer depth indicator module of claim 1, wherein the protective cover is selectively permeable and configured to prevent objects or debris from entering the internal cavity.

6. The boat trailer depth indicator module of claim 5, the protective cover including a series of regular, repeating apertures to form a cage-like construction that is selectively permeable according to a size of the apertures.

7. The boat trailer depth indicator module of claim 6, wherein the submersible enclosure is shaped like a rectangular prism and wherein the protective cover includes a pair of plates, each plate of the pair of plates secured to an opposing face of the submersible enclosure.

8. The boat trailer depth indicator module of claim 1, wherein the indicator arm extends only horizontally from the submersible enclosure.

9. The boat trailer depth indicator module of claim 1, the indicator comprising a LED, the LED configured to illuminate to provide the visual signal.

10. The boat trailer depth indicator module of claim 1, wherein the boat trailer depth indicator module is operable without connection to power other than from the power source and wherein the boat trailer depth indicator module is operable without communications with or to other devices.

11. The boat trailer depth indicator module of claim 1, wherein the power source comprises:
    a photovoltaic cell connected to a battery,
    wherein the photovoltaic cell provides power to the battery.

12. The boat trailer depth indicator module of claim 11, wherein the photovoltaic cell is mounted on an exterior of the submersible enclosure, and wherein the battery is mounted within the internal cavity of the submersible enclosure.

13. The boat trailer depth indicator module of claim 1, wherein the mounting bracket is integrally formed as a unitary piece with the submersible enclosure.

14. The boat trailer depth indicator module of claim 13, wherein the submersible enclosure includes a projection extending from the submersible enclosure and located a distance above the mounting bracket, the projection defining a slot with the mounting bracket to receive an end of the indicator arm therein.

15. The boat trailer depth indicator module of claim 1, the depth indicator module further comprising:
an adjustment knob engaging with an adjustment screw to removably secure the indicator module to the slide rail, wherein the adjustment screw passes through both the mounting bracket and the indicator arm to secure the depth indicator module to the slide rail,
wherein the adjustment knob and the adjustment screw allow for the boat trailer depth indicator module to be adjusted to various positions on the slide rail.

16. The boat trailer depth indicator module of claim 1, wherein the depth indicator module can be mounted to the slide rail and adjusted to various positions on the slide rail without the use of tools.

17. The boat trailer depth indicator module of claim 1, wherein the indicator module is positioned on the slide rail such that the water entering the submersible enclosure will cause activation of the indicator when a boat trailer is submersed at a boat ramp to an appropriate depth for launching or recovering a boat from or to the boat trailer.

18. The boat trailer depth indicator module of claim 1, the depth indicator module further comprising: an adjustment knob engaging with an adjustment screw to removably secure the indicator module to the slide rail, wherein the adjustment screw passes through both the mounting bracket and the indicator arm to secure the depth indicator module to the slide rail, and wherein the adjustment knob and the adjustment screw allow for the boat trailer depth indicator module to be adjusted to various positions on the slide rail without the use of tools, and
the power source comprising:
a photovoltaic cell connected to a battery, wherein the photovoltaic cell provides power to the battery, wherein the photovoltaic cell is mounted on an exterior of the submersible enclosure, and wherein the battery is mounted within the internal cavity of the submersible enclosure, and
wherein the indicator arm extends only horizontally from the submersible enclosure.

19. The boat trailer depth indicator module of claim 1, wherein the boat trailer depth indicator module is configured to generate a remote signal, the remote signal selected from a group consisting of: a Wi-Fi signal, a Bluetooth signal, a text message signal, a phone call signal, and a mobile app notification signal.

20. A method for installing a boat trailer depth indicator module to a slide rail attached to a boat trailer, the method comprising:
providing a slide rail;
attaching the slide rail to a boat trailer;
providing the boat trailer depth indicator module, the depth indicator module including:
a submersible enclosure containing an actuation element located within an internal cavity, the internal cavity at least partially surrounded by a protective cover, the protective cover configured to allow communication of water into and out of the internal cavity;
an indicator arm removably coupled to the submersible enclosure, the indicator arm extending laterally and outwardly from the submersible enclosure, the indicator arm including an indicator at a free end, the indicator configured to provide a visual signal;
a power source mounted to and located on the submersible enclosure, the power source selectively powering the indicator; and
a mounting bracket connecting and supporting the submersible enclosure and the indicator arm relative to one another, the mounting bracket configured to selectively engage the slide rail;
sliding the depth indicator module onto an end of the slide rail; and
removably securing the depth indicator module to the slide rail at a position such that an amount of water entering the submersible enclosure activates the actuation element and operatively connects the power source to the indicator thereby illuminating the indicator to provide the visual signal.

21. The method for installing a boat trailer depth indicator module of claim 20, the step of removably securing the depth indicator module further comprising:
selecting the position of the depth indicator module on the slide rail such that water entering the submersible enclosure will cause activation of the indicator when the boat trailer is submersed at a boat ramp to an appropriate depth for launching or recovering a boat from or to the boat trailer.

22. The method for installing a boat trailer depth indicator module of claim 20, the step of removably securing the depth indicator module further comprising:
twisting an adjustment knob onto an adjustment screw, the adjustment screw passing through both the mounting bracket and the indicator arm,
wherein the adjustment knob and the adjustment screw allow for the boat trailer depth indicator module to be adjusted to various positions on the slide rail.

23. The method for installing a boat trailer depth indicator module of claim 20, wherein the step of removably securing the depth indicator module is performed without the use of tools and wherein the boat trailer depth indicator module can be adjusted to various positions on the slide rail without the use of tools.

* * * * *